(12) United States Patent
Otte

(10) Patent No.: US 9,016,959 B2
(45) Date of Patent: Apr. 28, 2015

(54) OPTO-ELECTRONIC MODULE WITH PATCHCORDS

(75) Inventor: Sven Otte, Hohen Neuendorf (DE)

(73) Assignee: FCI, Guyancourt (FR)

( * ) Notice: Subject to any disclaimer, the term of this patent is extended or adjusted under 35 U.S.C. 154(b) by 25 days.

(21) Appl. No.: 13/883,122

(22) PCT Filed: Nov. 7, 2011

(86) PCT No.: PCT/EP2011/069572
§ 371 (c)(1),
(2), (4) Date: Jun. 4, 2013

(87) PCT Pub. No.: WO2012/059602
PCT Pub. Date: May 10, 2012

(65) Prior Publication Data
US 2013/0266277 A1 Oct. 10, 2013

(30) Foreign Application Priority Data
Nov. 5, 2010 (WO) .................. PCT/IB2010/003151

(51) Int. Cl.
*G02B 6/36* (2006.01)
*G02B 6/12* (2006.01)
*G02B 6/38* (2006.01)
*G02B 6/42* (2006.01)

(52) U.S. Cl.
CPC ................ *G02B 6/42* (2013.01); *G02B 6/4256* (2013.01); *G02B 6/428* (2013.01); *G02B 6/4292* (2013.01)

(58) Field of Classification Search
USPC ............ 385/14, 75–78, 88–92, 134–136, 139
See application file for complete search history.

(56) References Cited

U.S. PATENT DOCUMENTS

| | | | |
|---|---|---|---|
| 5,892,872 A | 4/1999 | Glover | 385/94 |
| 6,425,692 B1 * | 7/2002 | Fujiwara et al. | 385/56 |
| 6,522,798 B2 * | 2/2003 | Chiappetta et al. | 385/14 |
| 7,218,828 B2 * | 5/2007 | Feustel et al. | 385/135 |
| 2008/0062980 A1 | 3/2008 | Sunaga et al. | 370/389 |
| 2009/0010600 A1 | 1/2009 | Kim et al. | 385/90 |
| 2009/0098760 A1 * | 4/2009 | Gurreri et al. | 439/374 |

FOREIGN PATENT DOCUMENTS

| | | |
|---|---|---|
| EP | 0 828 356 A2 | 3/1998 |
| EP | 1 202 095 A1 | 5/2002 |
| EP | 2 120 074 A1 | 11/2009 |
| JP | 2007-178490 | 7/2007 |

* cited by examiner

*Primary Examiner* — Akm Ullah
*Assistant Examiner* — Michael Mooney
(74) *Attorney, Agent, or Firm* — Harrington & Smith

(57) ABSTRACT

The invention relates to an electro-optical connection module, including a housing, at least one printed circuit board provided in the housing, an optical engine provided on the printed circuit board, the optical engine including at least one of a receiver device configured to transform optical signals received into electrical signals and a transmitter device configured to transform electrical signals received into optical signals, an optical engine port, and an electrical engine port, a pluggable optical port, an optical patch cable assembly connecting the optical engine port and the pluggable optical port for optical signal transmission, and a pluggable electrical port connected to the electrical engine port for electrical signal transmission.

16 Claims, 2 Drawing Sheets

OPTO-ELECTRONIC MODULE WITH PATCHCORDS

Figure 1:
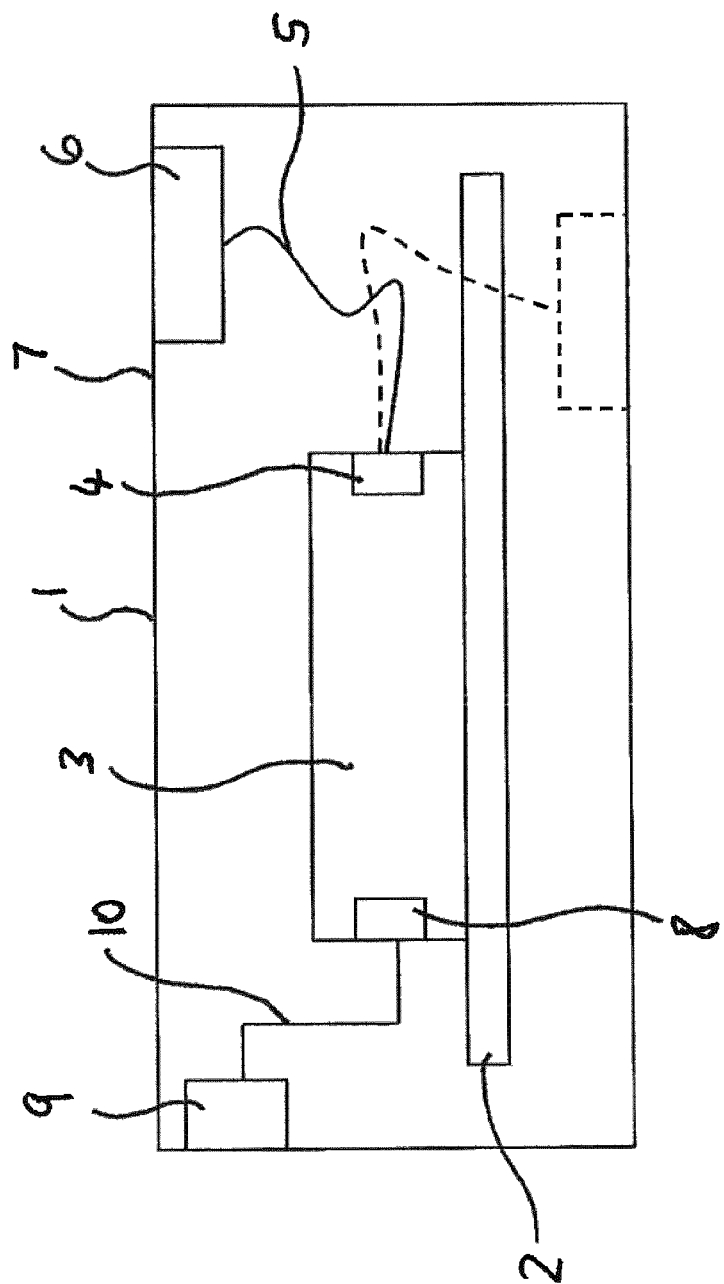

The invention relates to an electro-optical connection module.

BACKGROUND OF THE INVENTION

Electro-optical connection modules are used to connect an optical side configured for transmission of optical signals and an electrical side configured for transmission of electrical signals. In a known configuration, the electro-optical connection module is provided with a so-called optical engine comprising a receiver device configured to transform optical signals received into electrical signals and/or a transmitter device configured to transform electrical signals received into optical signals. An electro-optical connection module comprising both the receiver device and the transmitter device is also referred to as electro-optical transceiver.

Document EP 1 202 095 A1 discloses an electro-optical connection module comprising a first end designed to receive optical fibers, and means to convert a signal conveyed by these optical fibers into an electrical signal. Such means are preferably placed on a rigid portion of a printed circuit contained in the module. Furthermore, the printed circuit portion is connected by means of a flexible printed circuit portion to a printed circuit end. This printed circuit end has contacts in the form of an electrical plug at one end of the module. The second end is opposite to the first end of the module. Thus, the optical module is used for an electrical connection and comprises means to convert the optical signal received into an electrical signal.

SUMMARY OF THE INVENTION

It is the object of the invention to provide an improved electro-optical connection module with improved flexibility as to module element implementation.

According to the invention, an electro-optical connection module as defined in claim 1 is provided. Advantageous developments of the invention are disclosed in dependent claims.

According to an aspect of the invention, an electro-optical connection module is provided, the module comprising: a housing, at least one printed circuit board provided in the housing, an optical engine provided on the printed circuit board, a pluggable optical port, an optical patch cable assembly connecting the optical engine port and the pluggable optical port for optical signal transmission, and a pluggable electrical port connected to the electrical engine port for electrical signal transmission, wherein the optical engine comprises at least one of a receiver device configured to transform optical signals received into electrical signals and a transmitter device configured to transform electrical signals received into optical signals, an optical engine port, and an electrical engine port.

The invention, especially, provides the advantage of improved flexibility with respect to the implementation of the connection module elements. Such improved flexibility is due to connecting the optical engine and the pluggable optical port by means of the optical patch cable assembly. The patch cable assembly comprises an optical patch cable used to connect ("patch-in") optical device elements, namely the optical engine port and the pluggable optical port for optical signal transmission. The flexible character of the patch cable allows high flexibility as to positioning of the module elements to be connected by the patch cable assembly. For example, the pluggable optical port may be provided in different locations on the housing of the electro-optical connection module depending on different implementation needs for the module. Flexibility as to positioning of the pluggable optical port facilitates optimized use of the space available in the module housing.

In one embodiment, the patch cable assembly comprises a ribbon cable, e.g. one or more 12×ribbon cables.

In a preferred embodiment, at least one of the optical engine port and the pluggable optical port comprises an optical fiber ferrule. Usually, ferrules are secured to the end of an optical fiber to provide protection, and to enable the ease of use of optical fiber cables for the transmission of optical signals. Preferably, ferrules provide the means for make-break connections, and to terminate the optical fiber transmission cable. Optical fibers itself can be divided into two groups, the first, a multimode optical fiber that transmits laser energy of multiple laser modes, and the second, a single mode optical fiber that transmits a single laser mode or frequency.

According to a further embodiment, at least one of the pluggable optical port and the pluggable electrical port is provided in an opening of the housing. In a preferred embodiment, the pluggable optical port and/or the pluggable electrical port may be fixed to the housing.

In still a further embodiment, at least one of the pluggable optical port and the pluggable electrical port is at least partially implemented on the printed circuit board. The port elements of the pluggable electrical port and/or the pluggable optical port at least in part may be located/provided on the at least one printed circuit board. The pluggable optical port and the pluggable electrical port in part may be provided on different printed circuit boards. As an alternative, the pluggable optical port and/or the pluggable electrical port are fixed in the housing in a configuration separated from the printed circuit board, for example to a housing wall.

According to a preferred embodiment, the optical engine is provided with an optical transceiver device comprising both the receiver device and the transmitter device. Such electro-optical connection module is also referred to as electro-optical transceiver module.

In another preferred embodiment, the optical engine is provided on at least two printed circuit boards, the receiver device being provided on a first printed circuit board and the transmitter device being provided on a second printed circuit board. In a preferred embodiment, the printed circuit boards are provided in a so-called top-bottom-configuration where the printed circuit boards are provided one above the other. As an alternative, the printed circuit boards may be provided in one level side by side. In an alternative embodiment, at least one or all optical engines provided on the plurality of printed circuit boards may implement an optical transmitter device as well as an optical receiver device, such implementations being referred to as an electro-optical transceiver device.

In a preferred embodiment, the following features are provided:
the receiver device is provided with an optical receiver port connected to the pluggable optical port by the patch cable assembly,
the transmitter device is provided with an optical transmitter port connected to the pluggable optical port by the patch cable assembly,
the receiver is provided with an electrical receiver port connected to the pluggable electrical port, and
the transmitter is provided with an electrical transmitter port connected to the pluggable electrical port.

The present invention also includes a first electrical connector and a second electrical connector. The first electrical connector may have a first housing, a first connection port positioned at a first location on the first housing, a first printed circuit received in or on the first housing, and a first electrical connection, such as a flexible conductor of light or electrons, a telescoping conductor of light or electrons, an expandable or contractible conductor of light or electrons, etc. that electrically connects the first printed circuit board to the first connection port. The second electrical connector may have a second housing that is virtually identical to the first housing except for a position of the first connection port on the second housing, a second connection port that is virtually identical to the first connection port and is positioned at a second location on the second housing, a second printed circuit board that is virtually identical to the first printed circuit board and is received in or on the second housing, and a second electrical connection that is virtually identical to the first electrical connection, wherein the second electrical connection electrically connects the first printed circuit board to the second connection port. The second position is different than the first position. This embodiment generally describes two virtually identical connector housings, two virtually identical connection ports, and two virtually identical electrical connections, but two different pre-defined connection port locations or positions.

The present invention also includes a method of making a first electrical connector and a second electrical connector. Steps may include making a first housing for the first electrical connector, positioning a first connection port at a first location on the first housing, positioning a first printed circuit in or on the first housing, and providing a first electrical connection that electrically connects the first printed circuit board to the first connection port. Other steps may include making a second housing for the second electrical connector that is virtually identical to the first housing except for a position of a connection port, positioning a second connection port that is virtually identical to the first connection port at a second location on the second housing, positioning a second printed circuit board that is virtually identical to the first printed circuit board in or on the second housing, and providing a second electrical connection that is virtually identical to the first electrical connection, wherein the second electrical connection electrically connects the second printed circuit board to the second connector port. The second position is different than the first position.

The present invention also includes a first method of teaching a modifiable electrical connector, such as an electro-optical connection module, to a third party. The method may include the steps of teaching a third party or causing to be published to a third party an electrical connector with a movable connection port and selling the electrical connector with a movable connection port to the third party.

One or all of the optical ports may be provided with an optical fiber ferrule. In a preferred embodiment, the pluggable optical port is a joined optical port being connected to both the optical receiver port and the optical transmitter port. For example, the joined optical port may be implemented with a 24 fiber ferrule connector.

DESCRIPTION OF PREFERRED
EMBODIMENTS OF THE INVENTION

Figure 2:
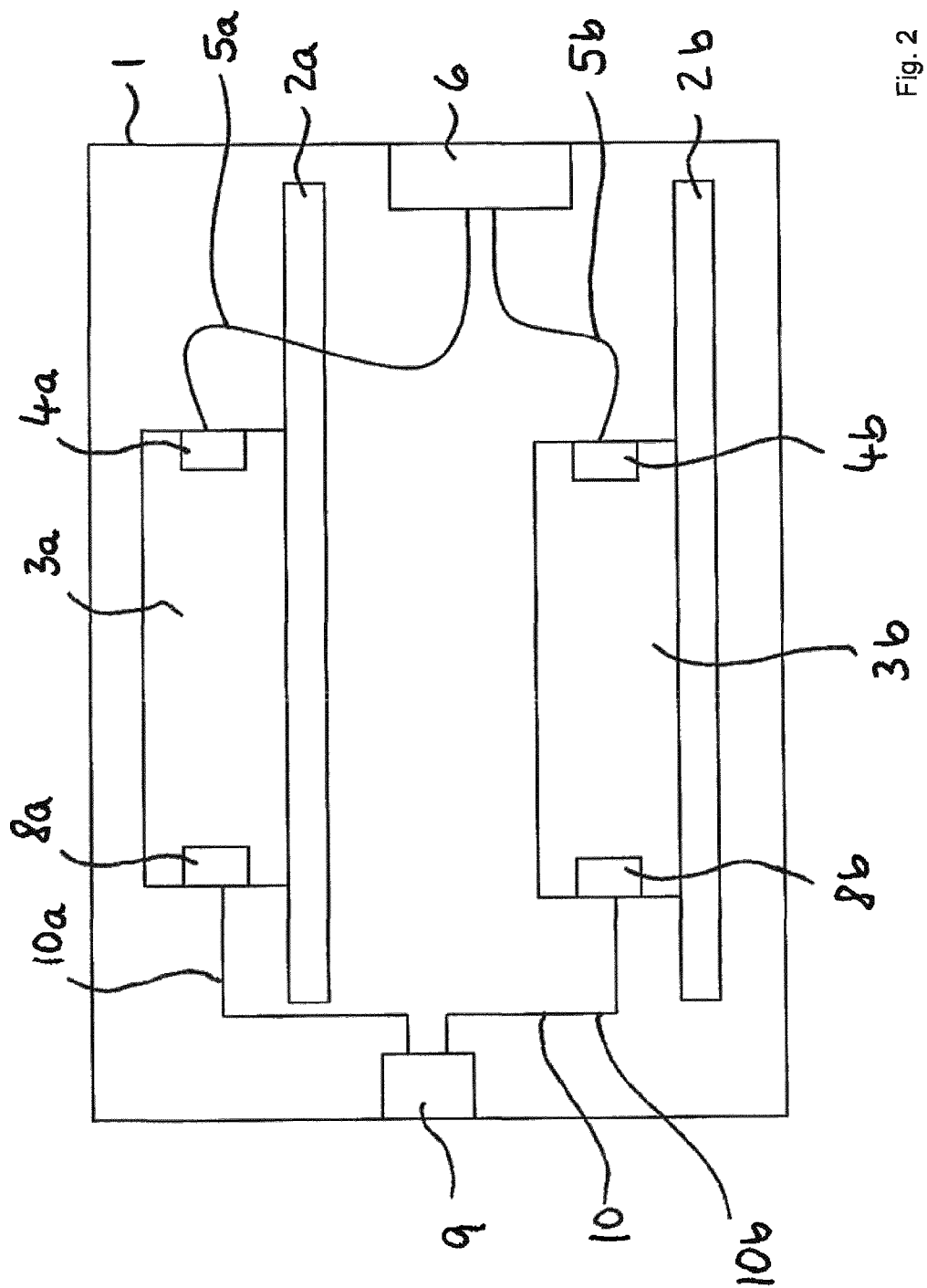

Following the invention will be described in further detail, by way of example, with reference to different embodiments. In the figures show:

FIG. 1 a schematic representation of an electro-optical connection module comprising a single printed circuit board, and FIG. 2 a schematic representation of another electro-optical connection module comprising two printed circuit boards carrying an optical receiver device and an optical transmitter device, respectively.

FIG. 1 shows a schematic representation of an electro-optical connection module comprising a housing 1. A printed circuit board 2 is received in the housing 1 and is carrying an optical engine 3. The optical engine 3 comprises at least one of a receiver device configured to transform optical signals received by the optical engine 3 into electrical signals and a transmitter device configured to transform electrical signals received by the optical engine into optical signals.

The optical engine 3 is provided with an optical engine port 4 configured to transmit and/or receive optical signals via an optical patch cable assembly 5 connecting the optical engine port 4 to a pluggable optical port 6 which is, in the depicted embodiment, attached to a housing wall 7, thereby providing a receiving part of an optical connector. The pluggable optical port 6 is configured to receive a mating part of the optical connector to make connection to an optical fiber cable (not shown). Because of the flexibility of the patch cable assembly 5, the pluggable optical port 6 may be provided in different locations within in the housing 1 depending on the needs in different implementations of the electro-optical connection module. The latter is shown in FIG. 1 by dashed lines. For example, the pluggable optical port 6 may be fixed in different locations to the housing wall 7. Also, the pluggable optical port 6 may be, at least in part, be implemented on the printed circuit board 2 (not shown).

Referring still to FIG. 1, the optical engine 3 is provided with an electrical engine port 8 which is connected to a pluggable electrical port 9 by an electrical connection 10 made, for example, of an electrical patch cable. The electrical engine port is configured to receive and/or transmit electrical signals.

Further referring to FIG. 1, if the optical engine 3 comprises the receiver device, optical signals received through the optical engine port 4 are transformed by a transformer element (not shown) into electrical signals transmitted via the electrical engine port 8. If the optical engine 3, alternatively or additionally, is provided with a transmitter device, electrical signals received via the electrical engine port 8 are transformed into optical signals by the transformer element and transmitted via the optical engine port 4. Transformer elements transforming electrical signals into optical signals and/or optical signals into electrical signals are known as such in different configurations. For example, the optical engine 3 may comprise one or more photodiodes and/or VCSEL (vertical cavity solid emitting laser) emitter diodes. But, also other optical components may be provided for implementation of the optical engine 3.

FIG. 2 shows a schematic representation of another embodiment of an electro-optical connection module. In FIG. 2 the same features are identified by the same reference numerals used in FIG. 1.

Within the housing 1 a first and a second printed circuit board 2a, 2b are provided in a top-bottom-configuration above each other. On the first printed circuit board 2a a first optical engine 3a is provided which is, in the embodiment shown, implementing an optical transmitter device. Electrical signals received via the electrical port 9, a first electrical connection 10a and an optical transmitter port 8a are transformed into optical signals by the first optical engine 3a implementing the optical transmitter device. Following, the optical signals are sent via a first optical transmitter port 4a, a first optical patch cable 5a, and the optical port 6 which is provided as a joined optical port connected to both the first optical transmitter port 4a and a second optical transmitter port 4b of a second optical engine 3b implementing an optical receiver device.

The second optical engine 3b provided on the second printed circuit board 2b is configured to receive optical signals on an optical receiver port 4b. The optical signals received are transformed into electrical signals by the second optical engine 3b. Following, the generated electrical signals are transmitted via an electrical receiver port 8b through a second electrical connection 10b, and the electrical port 9.

In an alternative embodiment, the first and/or the second optical engine 3a, 3b may implement and optical transmitter as well as an optical receiver, such implementation being referred to as an electro-optical transceiver connection module.

The features disclosed in this specification, the figures and/or the claims may be material for the realization of the invention in its various embodiments, taken in isolation or in various combinations thereof.

The invention claimed is:

1. An electro-optical connection module, comprising:
a housing,
at least one printed circuit board provided in the housing,
an optical engine provided on the printed circuit board, the optical engine comprising:
    at least one of a receiver device configured to transform optical signals received into electrical signals and a transmitter device configured to transform electrical signals received into optical signals,
    an optical engine port, and
    an electrical engine port,
a pluggable optical port,
an optical patch cable assembly connecting the optical engine port and the pluggable optical port for optical signal transmission,
a pluggable electrical port, and
an electrical patch cable connecting the pluggable electrical port to the electrical engine port for electrical signal transmission, where the electrical patch cable is separate from the at least one printed circuit board.

2. The module according to claim 1, wherein at least one of the optical engine port and the pluggable optical port comprises an optical fiber ferrule.

3. The module according to claim 1, wherein at least one of the pluggable optical port and the pluggable electrical port is provided in an opening of the housing.

4. The module according to claim 1, wherein at least one of the pluggable optical port and the pluggable electrical port is at least partially implemented on the printed circuit board.

5. The module according to claim 1, wherein the optical engine is provided with an optical transceiver device comprising both the receiver device and the transmitter device.

6. The module according to claim 5, wherein the optical engine is provided on at least two printed circuit boards, the transmitter device being provided on a first printed circuit board and the receiver device being provided on a second printed circuit board.

7. The module according to claim 6, wherein
the receiver device is provided with an optical receiver port connected to the pluggable optical port by the optical patch cable assembly,
the transmitter device is provided with an optical transmitter port connected to the pluggable optical port by the optical patch cable assembly,
the receiver device is provided with an electrical receiver port connected to the pluggable electrical port, and
the transmitter device is provided with an electrical transmitter port connected to the pluggable electrical port.

8. An electro-optical connection module, comprising:
a housing comprising walls,
at least one printed circuit board provided in the housing,
an optical engine connected to the at least one printed circuit board, the optical engine comprising an optical engine port and an electrical engine port,
a pluggable optical port connected to the optical engine port, and
a pluggable electrical port electrically connected to the electrical engine port,
where the pluggable optical port is configured to be connected to one of at least two of the walls while the optical engine is connected to the pluggable optical port.

9. The module according to claim 8, wherein the at least two walls define a cavity and the printed circuit board is received in the cavity.

10. The module according to claim 8, wherein the at two walls are parallel to one another.

11. The module according to claim 8, wherein the at least two walls intersect one another.

12. The module according to claim 8, where the pluggable electrical port is electrically connected to the electrical engine port separate from the at least one printed circuit board.

13. The module according to claim 12, where the pluggable optical port and the pluggable electrical port are configured to be attached to different ones of the walls of the housing.

14. An electro-optical connection module, comprising:
a housing,
at least one printed circuit board provided in the housing,
an optical engine provided on the printed circuit board, the optical engine comprising:
    at least one of a receiver device configured to transform optical signals received into electrical signals and a transmitter device configured to transform electrical signals received into optical signals,
    an optical engine port, and
    an electrical engine port,
a pluggable optical port fixed to the housing separated from the at least one printed circuit board,
an optical patch cable assembly connecting the optical engine port and the pluggable optical port for optical signal transmission,
a pluggable electrical port fixed to the housing separated from the at least one printed circuit board, and
an electrical connection connecting the pluggable electrical port to the electrical engine port for electrical signal transmission.

15. A module as in claim 14 where the pluggable optical port is configured to be alternatively connected to one of at least two walls of the housing while the optical engine is connected to the pluggable optical port.

16. A module as in claim 15 where the pluggable optical port and the pluggable electrical port are configured to be attached to different ones of the walls of the housing.

* * * * *